United States Patent [19]

Kahl

[11] 4,446,647

[45] May 8, 1984

[54] SPRING LOADED FISH HOOK

[76] Inventor: Manfred E. Kahl, P.O. Box 367, Northport, N.Y. 11768

[21] Appl. No.: 472,743

[22] Filed: Mar. 7, 1983

Related U.S. Application Data

[63] Continuation-in-part of Ser. No. 281,568, Jul. 9, 1981, Pat. No. 4,387,528, which is a continuation-in-part of Ser. No. 134,108, Mar. 25, 1980, abandoned.

[51] Int. Cl.$^3$ .............................................. A01K 83/02
[52] U.S. Cl. ......................................................... 43/36
[58] Field of Search ...................................... 43/34–37, 43/15, 43.4; 24/155 SC, 252 R, 260

[56] References Cited

U.S. PATENT DOCUMENTS

| 684,211 | 10/1901 | Ferch | 43/36 |
| 740,775 | 6/1902 | Pardon | 43/34 |
| 1,283,174 | 10/1918 | Helgeson | 43/36 |
| 1,381,003 | 6/1921 | Pierson | 43/36 |
| 2,223,946 | 12/1940 | Binkowski | 43/36 |
| 2,295,042 | 9/1942 | Llewellyn | 43/36 |
| 2,323,656 | 7/1943 | Heltenstein | 43/36 |
| 2,643,479 | 6/1953 | Stevenson | 43/36 |
| 2,982,047 | 5/1961 | Wileshusen | 43/36 |
| 3,175,322 | 3/1965 | Snyder | 43/36 |
| 3,222,814 | 12/1965 | Rossnan | 43/36 |
| 3,241,260 | 3/1966 | Keller | 43/36 |
| 3,492,752 | 2/1970 | Viveiros | 43/36 |
| 3,803,748 | 4/1974 | Neal | 43/36 |

Primary Examiner—Nicholas P. Godici
Assistant Examiner—Kurt Rowan
Attorney, Agent, or Firm—Kerkam, Stowell, Kondracki & Clarke

[57] ABSTRACT

A self-setting fish hook assembly includes an arm biasing spring to spread to hooks placed on first and second extending arms. A latch spring is mounted on one of the extending arms to hold the two extending arms together until a fish bites on both of the hooks and causes the extending arms to move momentarily closer together. This frees the latch spring to spring clear of the second extending arm and allows the arm biasing spring to unload, thereby spreading the two hooked arms. An embodiment which uses a coil arm biasing spring separate from the first and second extending arms allows the extending arms to be moved close together without loading the arm biasing spring.

13 Claims, 12 Drawing Figures

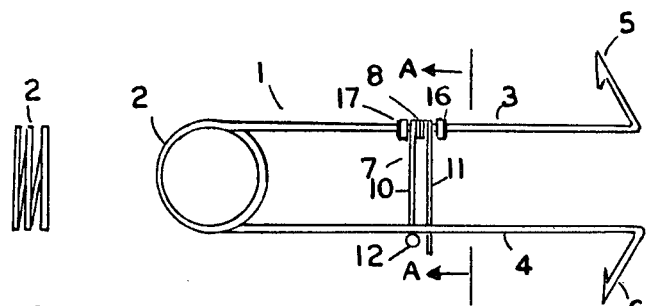
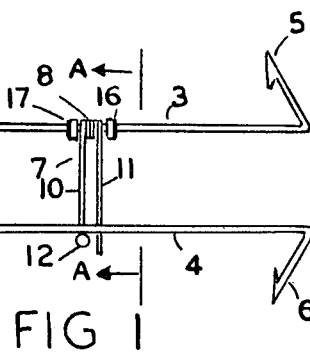
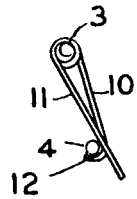
FIG IA　　FIG I　　FIG IB
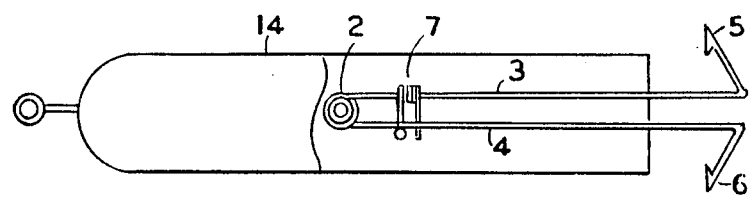
FIG 2
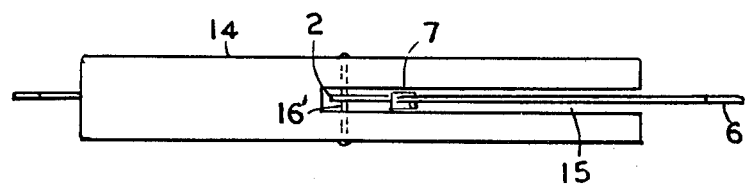
FIG 2A

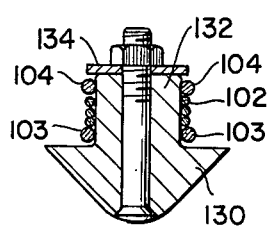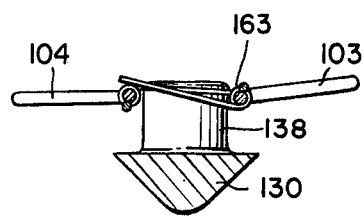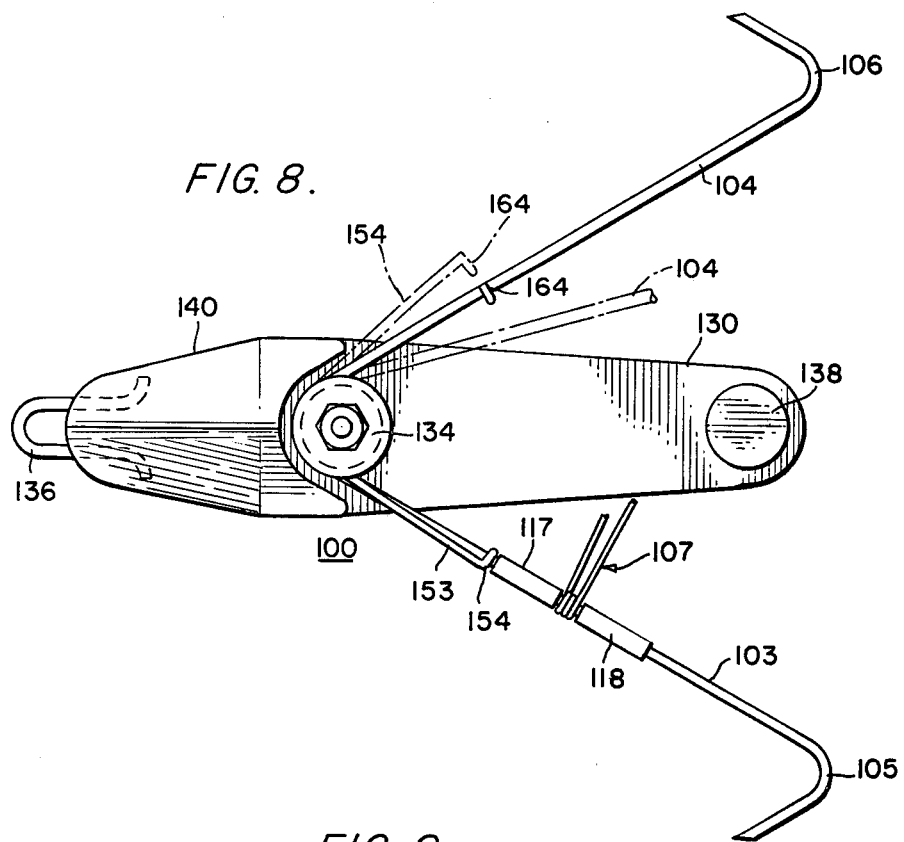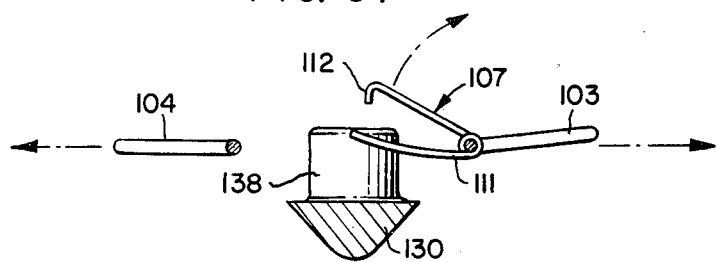

SPRING LOADED FISH HOOK

This application is a Continuation-in-Part of my prior co-pending application entitled "SELF SETTING FISH HOOK MEANS", filed July 9, 1981, Ser. No. 281,568, now U.S. Pat. No. 4,387,528, which in turn was a continuation-in-part of its co-pending application, U.S. Ser. No. 134,108, now abandoned, filed Mar. 25, 1980, for "SELF SETTING FISH HOOK".

TECHNICAL FIELD

This invention relates to self setting fish hooks and more particularly to a self setting fish hook assembly having two arms with hooks which are spring loaded and latched so that when the arms are compressed, the arms are released and spring apart.

BACKGROUND ART

Conventional fish hooks operate by the fish biting and the movement caused thereby being transmitted through the line and rod to the fisherman who then raises the rod to set the hook. This time lag and loss of motion due to the flexibility of the rod and the line and the slack in the line, often defeat the purpose of setting the hook. Self setting fish hooks are shown in U.S. Pat. Nos. 1,156,795; 2,491,546 and 2,856,722, and others. However, these devices are mechanically complicated and cumbersome, they operate differently from the present invention.

OBJECTS OF THE INVENTION

Accordingly, a principal object of the invention is to provide new and improved self setting fish hook means.

Another object of the invention is to provide a new and improved fishing lure with self setting fish hook means.

A further object of the present invention is to provide a fish hook assembly for larger fishes, but adapted to store in a relatively small space without the necessity of loading a spring.

SUMMARY OF THE INVENTION

The above and other objects of the present invention which will become apparent as the description proceeds are realized by a fish hook assembly comprising: an arm biasing spring and first and second extending arms, the arm biasing spring biasing the first and second extending arms apart; first and second hooks respectively disposed on the first and second arms; a latch spring mounted to the first extending arm, the latch spring having a first extending member with a hook portion at an end, the hook portion operative to hold the second extending arm compressed relatively close to the first extending arm, the hook portion further adapted to release the second extending arm when a fish causes the first and second extending arms to move closer together, and the latch spring is operative to snap the hook portion away from the second extending arm when a fish causes the first and second extending arms to move closer together such that the arm biasing spring springs the first and second extending arms apart. The latch spring is a coil latch spring wrapped around the first extending arm, the coil latch spring biasing the first extending member away from the second extending arm. The arm biasing spring is a coil spring integral with the first and second extending arms. Alternately, the arm biasing spring is a coil spring separate from the first and second extending arms and disposable in: a biasing position in which it opposes movement of the second extending arm towards the first extending arm, and a non-biasing position in which the second extending arm may freely move towards the first extending arm without loading the arm biasing spring. The arm biasing coil spring is wrapped around a mounting post and the first and second extending arms are mounted for pivoting about the mounting post. The arm biasing coil spring includes first and second spring extension portions each having a receiving bend to receive a different one of the first and second extending arms, and the biasing position requires each receiving bend to receive one of the first and second extending arms.

BRIEF DESCRIPTION OF THE DRAWINGS

These and other objects of the invention will be apparent from the following specification and drawings of which:

FIG. 1 is a side view of an embodiment of the invention.

FIG. 1A is one end view of FIG. 1.

FIG. 1B is the other end view of FIG. 1.

FIG. 2 is a top view, partially cut away, of a fishing lure embodying the invention.

FIG. 2A is a side view of FIG. 2.

FIG. 6 is a cross section view from lines 6—6 of FIG. 5.

FIG. 7 is a cross section view from lines 7—7 of FIG. 5.

FIG. 8 is a side view of the FIG. 3 embodiment in an unloaded state.

FIG. 9 is the same cross section view as FIG. 7 except that the embodiment is changing from a loaded to an unloaded state.

Referring to FIGS. 1, 1A and 1B, the invention comprises a spring 1, having a coil portion 2 and first and second extending arms 3 and 4. The arm 3 has a barbed hook portion 5 and the arm 4 has a barbed hook portion 6.

Figure 3:
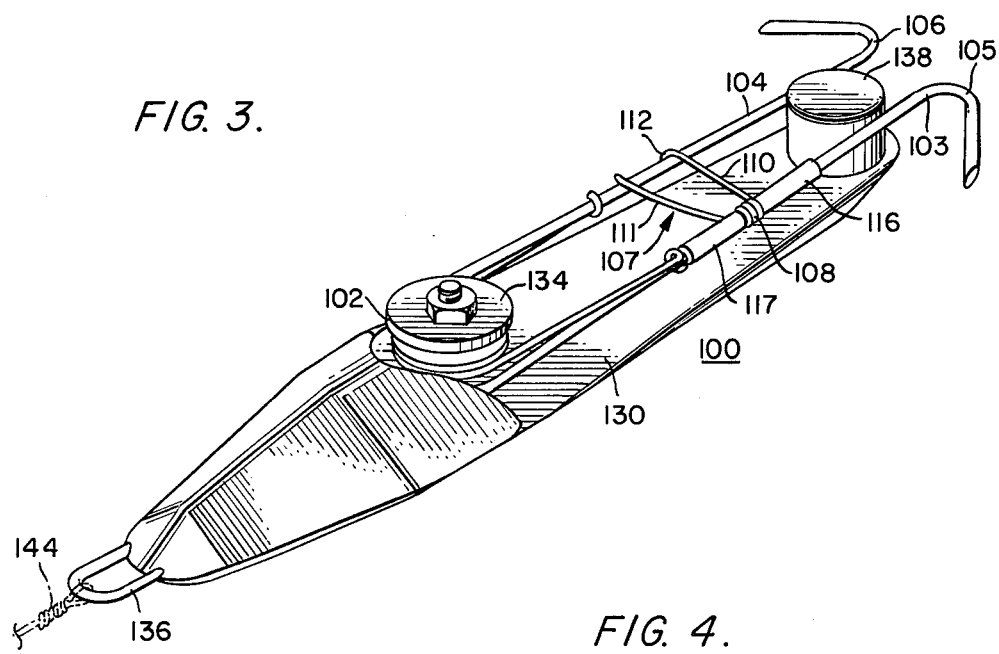
FIG. 3 is a perspective view of second embodiment.
Figure 4:
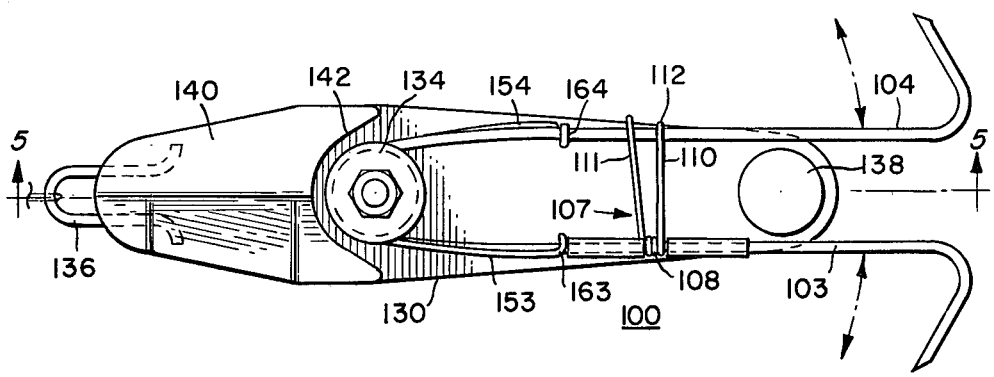
FIG. 4 is a side view of the FIG. 3 embodiment in a loaded state.
Figure 5:
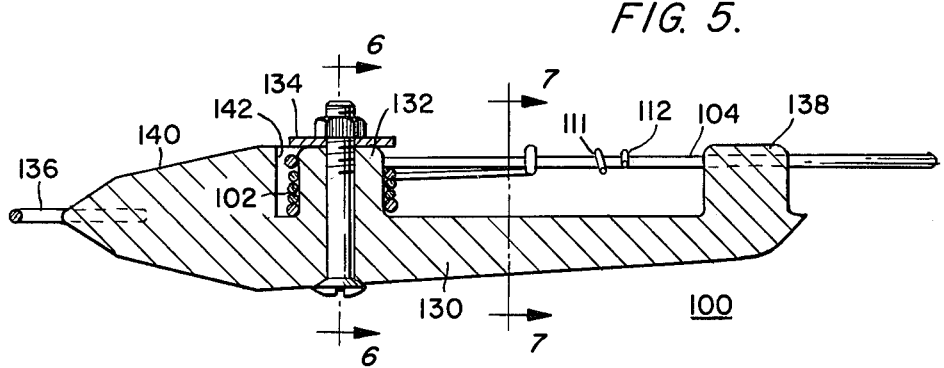
FIG. 5 is a cross section view from lines 5—5 of FIG. 4.

In operating position, the arms 3 and 4, are held in compressed parallel position as shown in FIG. 1 by means of the latch 7. The latch 7 is a spring which has a coil portion 8, mounted on arm 3 and retained by nylon rings 16, 17, and first and second extending arms 10 and 11. The arm 10 has a shallow hook portion 12. The arm 11 is longer than the arm 10 and extends down behind the arm 4, as shown in FIG. 1.

In operation, when the arms 3 and 4 are compressed by the fish biting on the hooks 5 and 6, the latch 7 will be released and the member 11 will snap the hook portion 12 away from the arm 4, thereby allowing the arm-biasing coil spring 2 to spring the arms 3 and 4 and hooks 5 and 6 away from each other, thereby setting one or more of the hooks in the fish's mouth.

FIG. 2 shows a fish lure having a body member 14, with a large slot 15. The self setting hook arrangement of FIG. 1 is mounted in the slot 15 by means of the axle 16 so that that hook assembly is rotatable about the axle 16'. The hook assembly 2, 3, 4, 5, 6 and 7 is the same as described in connection with FIG. 1. The hook assembly extends out beyond the lure so that it will operate substantially as described in connection with FIG. 1 when the hooks are compressed by a fish biting on them.

Turning now to FIGS. 3-9, a second embodiment of the present invention will be discussed. This second embodiment, which is especially well suited for catching larger fish with a larger fish hook assembly than the FIG. 1 embodiment, operates in essentially the same manner as the FIG. 1 embodimeht. This second embodiment is adpated to use a larger spring than the spring 2 of the first embodiment.

For ease of comparison with the FIG. 1 embodiment, the parts of the second fish hook assembly 100 shown in FIGS. 3-9 have been labeled in the 100 series with the same last two digits as the corresponding part of the FIG. 1 embodiment. Basically then, the first and second extending arms 103 and 104, first and second hooks 105 and 106, latch 107 comprising coil latch spring 108, first extending member 110 with hook portion 112, and second extending member 111 retaining rings or sleeves 116 and 117, and arm biasing spring 102 will be understood as operating in essentially the same manner as the corresponding parts of the FIG. 1 embodiment. Accordingly, emphasis will be placed in this discussion on the differences between the fish hook assembly 100 and the FIG. 1 embodiment.

The fish hook assembly 100 according to the present invention includes a base 130 having a mounting post 132 and an alignment post 138 disposed thereon. The base 130 further includes a built-up or thicker section 140 at its end opposite the alignment post 138. A connecting loop 136 is disposed within the built-up section 140 and allows the fish hook assembly 100 to be connected to a fishing line such as 144 (FIG. 3 only). A curved portion 142 in the built-up section 140 prevents the first and second extending arms 103 and 104 from being drawn more than a present angle from the alignment post 138.

A major difference of the fish hook assembly 100 from the FIG. 1 embodiment is that the arm biasing coil spring 102 is separate from the first and second extending arms 103 and 104, whereas the FIG. 1 embodiment uses an arm biasing coil section 2 which is integral with the first and second extending arms 3 and 4.

Each of the first and second extending arms 103 and 104 is mounted to the mounting post 102 by a single loop. The coil arm biasing spring 102 is mounted to the mounting post 132 in between the first and second extending arms as best shown in the cross section view of FIG. 6. A washer 134 which is bolted to the mounting post 132 as shown, prevents displacement of the first and second extending arms 103 and 104 and the coil arm biasing spring 102 from the mounting post 132.

A significant feature of the arm biasing coil spring 102 is its use of first and second spring extension portions 153 and 154. Since the coil arm biasing spring 102 is not integral with the extending arms 103 and 104, the first and second extending spring portions 153 and 154 have respective receiving bends 163 and 164 for respectively receiving the wire-like extending arms 103 and 104. As best shown in FIG. 7, the receiving bends 163 and 164 are essentially semicircular loops into which the corresponding extending arms 103 and 104 are inserted. However, the extending arm 104 may be removed from its receiving bend 164 as shown in phantom line in FIG. 8. This allows the extending arm 104 to be retracted adjacent the first extending arm 103 without loading the coil spring 102. That is, the coil spring 102 may be uncoupled from the second extending arm 104 by simply removing the second extending arm from the receiving bend 164. The phantom line broken away second extending arm 104 of FIG. 8 shows that this extending arm 104 may then be moved inside (i.e. closer to the alignment post 138) than the extending spring portion 154.

This feature of allowing the uncoupling of the extending arm 104 from the spring extension portion of 154 allows the fishing hook assembly 100 to be stored in a smaller space (extending arms 103 and 104 relatively close together) without having the fishing hook assembly in its loaded state. Obviously, the fishing hook assembly 100 should not be stored in the loaded state because this might cause injury when removing it from a tackle box or other place of storage.

If desired, the first and second spring extension portions 153 and 154 could be capable of being uncoupled from the corresponding first and second extending arms 103 and 104. Alternately, the first spring extension portion 153 could be permanently attached to the first extending arm 103 as by having it clamp the retaining ring 117.

The principles of operation of the present invention are straightforward. The hook portions 105 and 106 are preferably baited prior to the loading of the coil arm biasing spring 102. The arm biasing spring 102 is then disposed in its biasing position in which it opposes movement of the second extending arm towards the first extending arm, this being accomplished by ensuring coupling between the receiving bends 163 and 164 and the respective extending arms 103 and 104. The extending arms 103 and 104 are then brought together with the alignment post 134 in between the two extending arms. The latch coil spring 107 is placed in the position shown in FIG. 3 with its hook portion 112 latching on to the second extending arm 104. Upon a fish bringing the first and second arms 103 and 104 momentarily closer together, the spring latch 107 will spring away from the second extending arm 104, thereby allowing the arm biasing coil spring 102 to quickly spread the first and second extending arms 103 and 104.

After the fish hook assembly 100 has been used, it is simply prepared for storing by uncoupling the second extending arm 104 from the receiving bend 164. This disposes the arm biasing coil spring 102 in a non-biasing position in which the second extending arm 104 may freely move towards the first extending arm 103 without loading the arm biasing spring 102.

Although the present description includes various details, it is to be readily understood that these are for illustrative purposes only. Various modifications and adaptations will be readily apparent to those of ordinary skill in the art. Accordingly, the scope of the present invention should be determined by reference to the claims appended hereto.

What is claimed is:
1. A fish hook assembly comprising:
an arm-biasing spring and first and second extending arms, said arm-biasing spring biasing said first and second extending arms apart; first and second hooks respectively disposed on said first and second extending arms; a latch spring mounted to said first extending arm, said latch spring having a first extending member with a hook portion at an end, said hook portion operative to hold said second extending arm compressed relatively close to said first extending arm, said hook portion adapted to release said second extending arm when a fish causes said first and second extending arms to move closer together, and said latch spring is operative to snap said hook portion away from said second extending arm when a fish causes said first and second extending arms to move closer together such that said arm-biasing spring springs said first and second extending arms apart, said latch spring is a coil latch spring wrapped around said first extending arm, said coil latch spring biasing said first extending member away from said second extending arm, said arm-biasing spring is a coil spring, said arm-biasing spring is separate from said first and second extending arms, and wherein said arm-biasing spring is disposable in:
(i) a biasing position in which is opposes movement of said second extending arm towards said first extending arm, and
(ii) a non-biasing position in which said second extending arm may freely move towards said first extending arm without loading said arm-biasing spring.

2. A fish hook assembly comprising:
(a) first and second extending arms,
(b) first and second hooks respectively disposed on said first and second arms,
(c) an arm-biasing spring for biasing said first and second extending arms apart, and
(d) a latch operative to latch the fish hook assembly in a loaded condition with said second extending arm relatively close to said first extending arm and loaded by said arm-biasing spring, said latch is operative to release said second extending arm when a fish causes said first and second extending arms to move closer together such that said arm-biasing spring springs said first and second extending arms apart,
and wherein said arm-biasing spring is disposable in:
(i) a biasing position in which it opposes movement of said second extending arm towards said first extending arm, and
(ii) a non-biasing position in which said second extending arm may freely move towards said first extending arm without loading said arm-biasing spring.

3. The fish hook assembly of claim 2 wherein said latch is a latch spring.

4. The fish hook assembly of claim 3 wherein said latch spring is a coil latch spring having a first extending member with a hook portion at an end, said hook portion operative to hold said second extending arm compressed relatively close to said first extending arm, said hook portion adapted to release said second extending arm when a fish causes said first and second extending arms to move closer together, and said coil latch spring is operative to snap said hook portion away from said second extending arm when a fish causes said first and second extending arms to move closer together such that said arm-biasing spring springs said first and second extending arms apart.

5. The fish hook assembly of claim 4 wherein said arm-biasing spring is a coil spring wrapped around a mounting post and wherein said first and second extending arms are mounted for pivoting about said mounting post.

6. The fish hook assembly of claim 5 wherein said arm-biasing coil spring includes at least a first spring extension portion having a receiving bend to receive one of said first and second extending arms, said biasing position requiring said receiving bend to receive said one of said first and second extending arms.

7. The fish hook assembly of claim 2 wherein said arm-biasing spring is a coil spring wrapped around a mounting post and wherein said first and second extending arms are mounted for pivoting about said mounting post.

8. The fish hook assembly of claim 7 wherein said arm-biasing coil spring includes at least a first spring extension portion having a receiving bend to receive one of said first and second extending arms, said biasing position having said receiving bend receiving said one of said first and second extending arms.

9. The fish hook assembly of claim 8 wherein said arm-biasing coil spring includes a second spring extension having a receiving bend to receive the other of said first and second extending arms and said biasing position having said receiving bend of said second spring extension receiving said other of said first and second extending arms.

10. The fish hook assembly of claim 1 wherein said coil latch spring has a second extending member longer than said first extending member and biased away from said first extending member by said coil latch spring.

11. A fish hook assembly comprising:
(a) first and second extending arms,
(b) first and second hooks respectively disposed on said first and second arms,
(c) an arm-biasing spring separate from said first and second extending arms and operative to bias said first and second arms apart, and
(d) a latch coil spring mounted around said first extending arm and operative to latch the fish hook assembly in a loaded condition with said second extending arm relatively close to said first extending arm and loaded by said arm-biasing spring,
said latch spring having a first extending member with a hook portion at an end, said hook portion operative to hold said second extending arm compressed relatively close to said first extending arm, said hook portion adapted to release said second extending arm when a fish causes said first and second extending arms to move closer together, and said latch spring is operative to snap said hook portion away from said second extending arm when a fish causes said first and second extending arms to move closer together such that said arm-biasing spring springs said first and second extending arms apart,
wherein said arm biasing spring is disposable in:
(i) a biasing position in which it opposes movement of said second extending arm towards said first extending arm, and
(ii) a non-biasing position in which said second extending arm may freely move towards said first extending arm without loading said arm-biasing spring.

12. The fish hook assembly of claim 11 wherein said arm-biasing spring is a coil spring wrapped around a mounting post and wherein said first and second extending arms are mounted for pivoting about said mounting post.

13. The fish hook assembly of claim 2 wherein said arm-biasing coil spring includes at least a first spring extension portion having a receiving bend to receive one of said first and second extending arms, said biasing position requiring said receiving bend to receive said one of said first and second extending arms.

* * * * *